(12) United States Patent
Parrish

(10) Patent No.: US 8,511,396 B2
(45) Date of Patent: Aug. 20, 2013

(54) FLAME SUPPRESSION AGENT, SYSTEM AND USES

(75) Inventor: Clyde F. Parrish, Melbourne, FL (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 2673 days.

(21) Appl. No.: 10/476,175

(22) PCT Filed: May 20, 2002

(86) PCT No.: PCT/US02/16009
§ 371 (c)(1),
(2), (4) Date: Nov. 4, 2003

(87) PCT Pub. No.: WO02/096519
PCT Pub. Date: Dec. 5, 2002

(65) Prior Publication Data
US 2004/0129435 A1    Jul. 8, 2004

Related U.S. Application Data

(60) Provisional application No. 60/293,918, filed on May 25, 2001.

(51) Int. Cl.
*A62C 2/00* (2006.01)
*A62C 3/00* (2006.01)

(52) U.S. Cl.
USPC ..... 169/46; 169/26; 169/27; 252/2; 252/8.05; 524/567

(58) Field of Classification Search
USPC ............ 169/27; 252/2, 8, 8.05; 524/567, 524/608; 526/293; 528/347
See application file for complete search history.

(56) References Cited

U.S. PATENT DOCUMENTS

| T0861043 I4 | * | 4/1969  | Gross ........................ 169/57 |
| 3,516,941 A |   | 6/1970  | Matson |
| 3,575,882 A |   | 4/1971  | Vandegaer et al. |
| 3,753,770 A | * | 8/1973  | Braude et al. ............ 428/413 |
| 3,852,401 A |   | 12/1974 | Suzuki et al. |
| 3,853,179 A | * | 12/1974 | Lindgren et al. ........... 169/15 |
| 3,872,050 A | * | 3/1975  | Benton et al. .............. 524/774 |

(Continued)

FOREIGN PATENT DOCUMENTS

| DE | 22 33 544 A | 1/1974 |
| EP | 0 342 685 A1 | 11/1989 |

(Continued)

OTHER PUBLICATIONS

Jerry A. Brown, "Next Generation Fire Suppressants," Conference Publication, (1995).

*Primary Examiner* — Dinh Q Nguyen
(74) *Attorney, Agent, or Firm* — Shelley Ford; Jennifer P. Yancy

(57) ABSTRACT

Aqueous droplets encapsulated in a flame retardant polymer are useful in suppressing combustion. Upon exposure to a flame, the encapsulated aqueous droplets rupture and vaporize, removing heat and displacing oxygen to retard the combustion process. The polymer encapsulant, through decomposition, may further add free radicals to the combustion atmosphere, thereby further retarding the combustion process. The encapsulated aqueous droplets may be used as a replacement to halon, water mist and dry powder flame suppression systems.

26 Claims, 4 Drawing Sheets

(56) References Cited

U.S. PATENT DOCUMENTS

| | | | |
|---|---|---|---|
| 3,912,647 A | | 10/1975 | Adell |
| 3,954,914 A | * | 5/1976 | Rim et al. .................... 524/411 |
| 3,968,060 A | * | 7/1976 | Vincent et al. .................. 521/76 |
| 3,976,580 A | * | 8/1976 | Kaminstein et al. .............. 252/2 |
| 4,138,356 A | * | 2/1979 | Vincent et al. ........... 252/182.27 |
| 4,193,889 A | | 3/1980 | Baatz et al. |
| 4,428,983 A | * | 1/1984 | Nehen et al. ............. 427/213.34 |
| 4,601,863 A | | 7/1986 | Shioi et al. |
| 4,612,239 A | | 9/1986 | Dimanshteyn |
| 4,871,477 A | * | 10/1989 | Dimanshteyn ................ 252/609 |
| 4,957,950 A | * | 9/1990 | Staendeke et al. ............ 523/205 |
| 5,052,618 A | * | 10/1991 | Carlon et al. ................... 239/77 |
| 5,056,602 A | * | 10/1991 | Tapscott et al. ................. 169/46 |
| 5,098,621 A | * | 3/1992 | Hermann ...................... 264/46.4 |
| 5,116,891 A | | 5/1992 | Eberspach et al. |
| 5,165,483 A | | 11/1992 | Fox |
| 5,433,953 A | * | 7/1995 | Tsuei et al. ................... 424/489 |
| 5,629,382 A | | 5/1997 | Cipolli et al. |
| 5,861,106 A | | 1/1999 | Olander |
| 5,863,862 A | | 1/1999 | Eck et al. |
| 5,918,680 A | | 7/1999 | Maranghides |
| 6,065,546 A | | 5/2000 | Uetake et al. |
| 6,113,935 A | | 9/2000 | Rodson et al. |
| 6,579,911 B1 | * | 6/2003 | Vo et al. .......................... 521/85 |
| 6,863,846 B1 | * | 3/2005 | Zubkova et al. ............. 252/609 |

FOREIGN PATENT DOCUMENTS

| | | |
|---|---|---|
| EP | 0 389 768 A2 | 10/1990 |
| EP | 0 775 736 A2 | 5/1997 |
| JP | 48 035694 B | 12/1970 |
| JP | 51 069545 A | 12/1974 |
| JP | 62246918 | 10/1987 |
| JP | 11 029773 A | 7/1997 |
| WO | WO 99/12640 | 3/1999 |

\* cited by examiner

FLAME SUPPRESSION AGENT, SYSTEM AND USES

RELATED APPLICATION

This application claims priority to U.S. Provisional patent application Ser. No. 60/293,918 filed May 25, 2001 and titled "Non-Toxic Environmentally Safe Halon Replacement," which is commonly assigned and incorporated by reference herein.

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention is directed to a fire extinguishing, or flame suppression, agent.

BACKGROUND OF THE INVENTION

It is well known that water effectively suppresses or "puts out" a flame by lowering the flame temperature and reducing the concentration of oxygen available for the combustion process. For example, water mists have met with recent success as a fire suppression agent. The temperature of the flame is lowered because the high latent heat of vaporization of water absorbs energy from the flame as the water evaporates. The concentration of oxygen is lowered because the water droplets actually displace oxygen as they evaporate.

One of the drawbacks of employing water mists is the difficulty in producing such mists in confined areas and the fact that water can evaporate before it reaches the base of the flame. Halons have been used to overcome these types of problems; however, they contribute to global warming and ozone depletion. Furthermore, production of halons is currently banned by international agreement. Conventional halon replacements have been found to be either ineffective and may contribute to global warming and/or ozone depletion.

There is a current need for a water droplet system that can effectively deliver water droplets to the flame, extract sufficient energy from the flame by evaporation of the water droplets, displace oxygen with the vaporized water, and inhibit the flame propagation reaction.

When halon production was barred in the early 90's due to its strong contribution to ozone depletion and global warming, an intensified effort was begun to find suitable replacement agents. Because the agent should be adaptable for indoor use, it was necessary to find non-toxic agents. In addition, because of the need to suppress fires that may endanger and even engulf electronic components, it was necessary for the agent to be gaseous or liquid with low residue.

After considering a variety of materials, small particle water mist (from 10-100μ in size) was found to meet many of the requirements of a successful flame suppression agent. For example, advantages to the chemical nature of water include the following:

1. Evaporation of water produces water vapor that acts as an inert gas to reduce the concentration of oxygen.
2. Water is non-toxic.
3. Water does not contribute to ozone depletion.
4. Vaporization of water is very endothermic due to the large enthalpy of vaporization, which lowers the flame temperature.
5. Water does not contribute to global warming.

However, water droplets have several problems that must be overcome before they can be utilized in flame suppression. These problems include:

1. Water freezes below 0° C.
2. Distribution of small size water droplets is difficult.
3. Production of monodispersed droplets is very difficult.
4. Projection of water mist into a fire is difficult.
5. A large portion of the water droplets evaporate before they reach the flame.

As will become clear from the following, the present invention provides a way of realizing the benefits from using small size water droplets, or water-containing droplets, to retard and suppress a flame while, at the same time, overcoming the known problems associated with the use of such water droplets.

SUMMARY

The present invention is directed to a nontoxic, non-ozone depleting, and non-global warming fire-extinguishing agent. This material is a water or water gel that is microencapsulated in a polymer that has fire-extinguishing properties. Aqueous droplets encapsulated in a flame retardant polymer are useful in suppressing combustion. Upon exposure to a flame or excessive heat, the encapsulated aqueous droplets rupture and vaporize, removing heat and displacing oxygen to retard the combustion process. The polymer encapsulant, through decomposition, may further add free radicals to the combustion atmosphere. Thereby further retarding the combustion process. The encapsulated aqueous droplets may be used as a replacement to halon, water mist and dry powder flame suppression systems.

For one embodiment, the invention provides a flame suppression agent. The flame suppression agent includes aqueous droplets encapsulated in a flame retardant polymer. For another embodiment, the invention provides a method of suppressing a flame. The method includes applying encapsulated aqueous droplets to the flame. For yet another embodiment the invention provides a flame suppression system. The flame suppression system includes a container containing encapsulated aqueous droplets and a dispenser for dispensing the encapsulated aqueous droplets from the container upon demand. The invention further includes methods and apparatus of varying scope.

DETAILED DESCRIPTION OF THE INVENTION

Figure 1A:
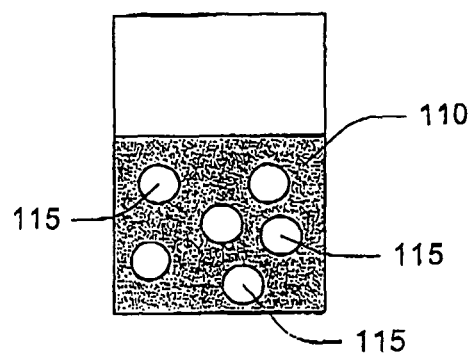
FIGS. 1A-1C are representations of process stages in the encapsulation of aqueous droplets by an in-liquid drying, or complex emulsion, technique for use with embodiments of the invention.

The following embodiments of the present invention are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims and equivalents thereof.

The present invention is directed to a flame suppression system utilizing small size aqueous droplets encapsulated in a flame retardant polymer. Microencapsulation serves to stabilize the aqueous droplets and prevent their premature evaporation. For embodiments using a halogenated polymer for encapsulation, decomposition of the encapsulated aqueous droplets will give rise to free radicals, which function to further inhibit flame propagation. The microencapsulated aqueous flame suppression system can be used to replace current agents in halon, water mist and dry powder fire extinguishers.

The commercial application of microencapsulation techniques began in 1940 with the development for the first carbonless copy paper by Barrett Green (*American Chemical Society Symposium on Microencapsulation: Processes and Applications*, held in Chicago, August 1973, Jan E. Vandegaer, Ed., Plenum Press, NY and London, p3.) and by 1959 with the development of new methods and commercial applications the field began an explosive growth. Microencapsulation techniques are thus well known and many are suitable for the encapsulation of aqueous droplets. As one example, a review of microencapsulation methods by Thies (*Microencapsulation*, Kirk-Othmer, Encyclopedia of Chemical Technology, pp 628-651, Vol. 16, $4^{th}$ Ed, John Wiley & Sons, New York) finds several techniques that are suitable for use with the invention:

1. Complex coacervation
2. Polymer-Polymer incompatibility
3. Interfacial polymerization at liquid-liquid interfaces
4. In situ polymerization
5. Solvent evaporation or in-liquid drying
6. Selective polymer solubility
7. Submerged nozzle extrusion
8. Spray drying
9. Fluidized bed
10. Centrifugal extrusion
11. Extrusion or spraying into a desolvation bath
12. Rotational suspension separation Several examples are provided herein for the manufacture of encapsulated aqueous droplets in accordance with the invention. However, the invention is not limited to a specific microencapsulation technique.

Figure 1B:
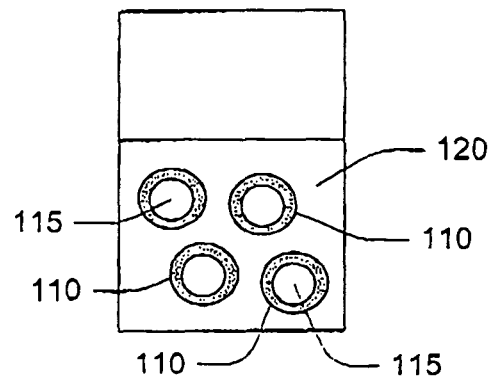
Figure 1C:
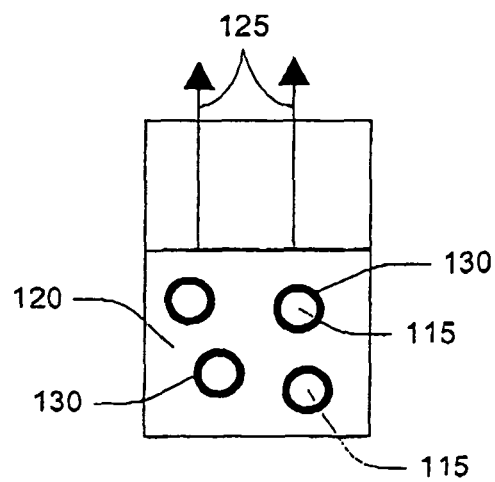

FIGS. 1A-1C are representations of process stages in the encapsulation of aqueous droplets by an in-liquid drying, or complex emulsion, technique for use with embodiments of the invention. In general, an aqueous phase 115 is dispersed in a hydrophobic organic phase 110 as shown in FIG. 1A to produce a water-in-oil emulsion. A high-speed blender or homogenizer can be used to create a water-in-oil emulsion.

For one embodiment, the aqueous phase 115 is essentially water. For another embodiment, the aqueous phase 115 contains a gelling agent in addition to water. For yet another embodiment, the aqueous phase 115 additionally contains a surfactant to aid in forming the droplets. The aqueous phase 115 may further contain additional components that do not materially affect the basic and novel properties of the flame suppression agents disclosed herein. The organic phase 110 contains the encapsulant in solution.

Encapsulants for use with the invention are fire retardant polymers. Examples of some fire retardant polymers include halogenated polymers and, more specifically, brominated polymers. For one embodiment, the brominated polymer is a bromostyrene polymer, such as poly(4-bromostyrene). However, other polymers with fire retardant properties may be used. In general, the fire retardant polymer should be self-extinguishing upon removal of a heat source. For one embodiment, the organic phase 110 contains poly(4-bromostyrene) dissolved in methylene chloride.

In FIG. 1B, a second aqueous phase 120 is added to the emulsion, thereby generating a (water-in-oil)-in-water emulsion. For one embodiment, the second aqueous phase 120 contains substantially the same composition as the first aqueous phase 115. For another embodiment, the second aqueous phase 120 contains water and a gelling agent having a concentration of the gelling agent of less than the first aqueous phase. Solvent 125 is then driven from the organic phase 110 to leave droplets of the aqueous phase 115 encapsulated in the fire retardant polymer 130 as shown in FIG. 1C.

Additional detail on the foregoing encapsulation technique may be found in *Microencapsulation Processing and Technology*, Marcel Dekker, Inc., Pub., 1979, page 110, in a described by A. Kondo and J. W. van Valkenburg. The principle of this method is to disperse the core material, i.e., the aqueous phase, in a solution of wall-forming material, i.e., the hydrophobic solvent containing the fire retardant polymer. The initial dispersion is then dispersed in an aqueous solution of a protective colloid (gelatin or similar material) followed by evaporation of the hydrophobic solvent. Once the solvent is evaporated, the encapsulated product may be isolated by filtration, washed with water to remove excess protective colloid, and air-dried.

For one embodiment, microencapsulation by selective polymer solubility is used to form the encapsulated aqueous droplets. Such encapsulation can be achieved by controlling the solubility of a polymer dissolved in a continuous phase of an emulsion. Solubility control is accomplished by adjusting the ratio of the two miscible hydrophobic solvents, one of which is a solvent for the polymer and one of which is not in general, an aqueous phase is dispersed in a first hydrophobic solvent phase to produce a water-in-oil emulsion. The aqueous phase may contain a surfactant and/or gelling agent to aid in forming the desired droplets. The first hydrophobic solvent phase contains an encapsulant dissolved in a first hydrophobic solvent.

Figure 2:
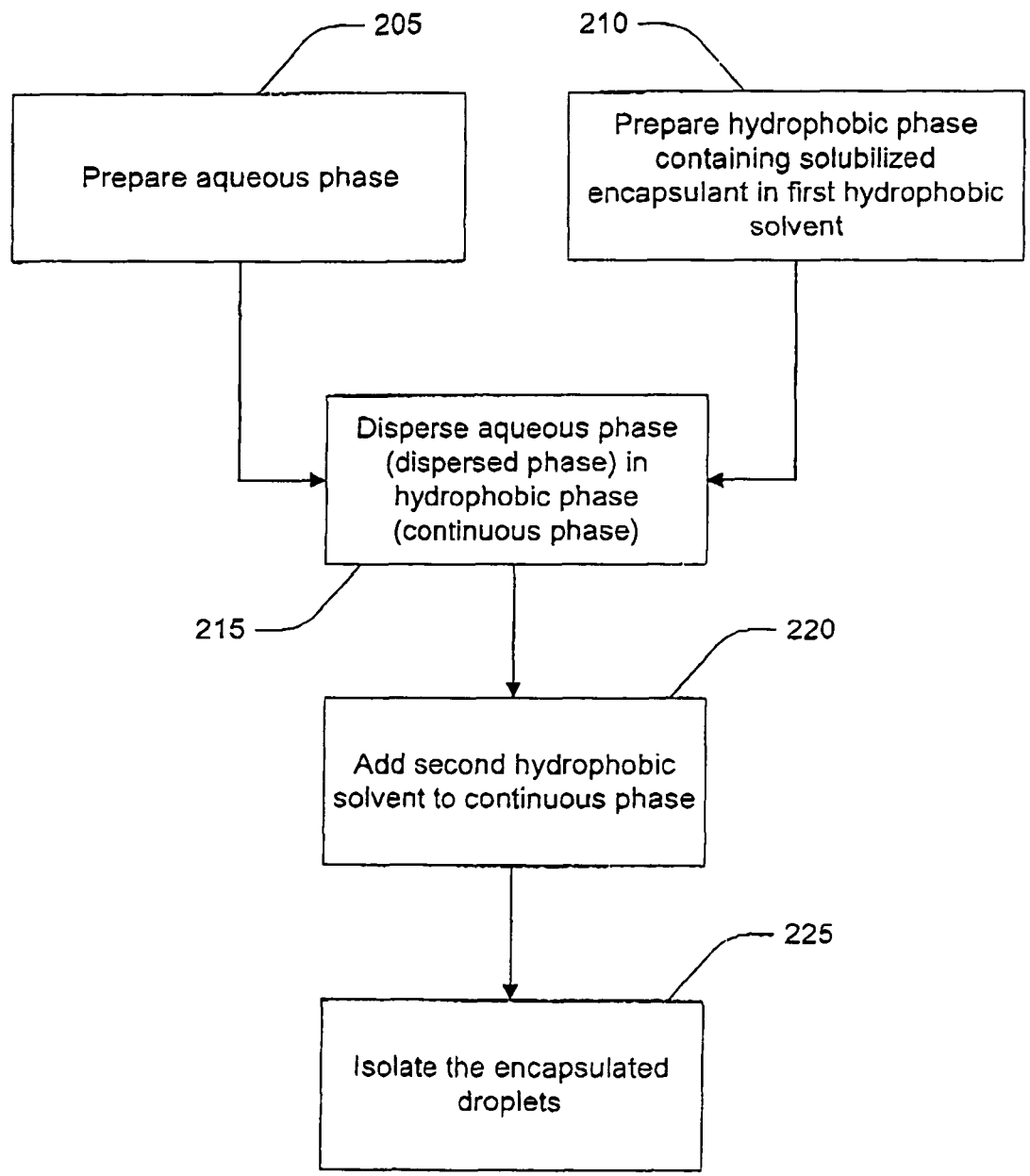
FIG. 2 is a flowchart of the encapsulation of aqueous droplets by a selective polymer solubility technique for use with embodiments of the invention.

FIG. 2 is a flowchart of the encapsulation of aqueous droplets by a selective polymer solubility technique for use with embodiments of the invention. An aqueous phase and a hydrophobic phase are prepared at 205 and 210, respectively. The aqueous phase contains at least water. The aqueous phase may further contain at least one of a surfactant or a gelling agent. The hydrophobic phase contains the fire retardant polymer encapsulant solubilized in a first hydrophobic solvent. As one example, the hydrophobic phase contains poly(4-bromostyrene) in methylene chloride.

At 215, the aqueous phase is dispersed in the hydrophobic phase to form an emulsion of the aqueous phase as the dispersed phase and the hydrophobic phase as the continuous phase. At 220, a second hydrophobic solvent is added slowly to the continuous phase. The first hydrophobic solvent is soluble, and preferably miscible, in the second hydrophobic solvent Further, the fire retardant polymer is substantially insoluble in the second hydrophobic solvent. This reduces the solubility of the fire retardant polymer in the first hydrophobic solvent, thus causing the polymer to deposit on the surface of the dispersed droplets of the aqueous phase. At 225, the encapsulated droplets are isolated or otherwise separated from the mixture. This can include a variety of separation techniques, including driving off the solvents through evaporation, filtering the encapsulated droplets from the mixture, centrifugal separation, etc.

For another embodiment, aqueous droplets are encapsulated using interfacial polymerization. Basically, microencapsulation by interfacial polymerization reactions occurs through condensation polymerization reactions, where some small molecule is eliminated in the process. For example, a polyester or polyamide can be prepared by reacting an acid chloride with an alcohol or an amine by eliminating a HCl molecule, see equations 1 and 2.

    Eq. 1

    Eq. 2

Condensation reactions in equations 1 or 2 take place between two different functional groups. For polymerization reactions, it requires that each monomer molecule unit have two functional groups. This means that either one monomer-molecule has the two different groups or two different molecules have two functional groups of the same type. Polymerization of each type of monomer system is illustrated in equations 3 and 4.

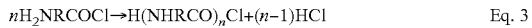    Eq. 3

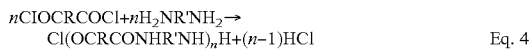    Eq. 4

There are generally four basic options for microencapsulation processes that use interfacial polymerization reactions to form the encapsulating shell. These options usually start by introducing a dispersed phase in the continuous phase by emulsification under agitation or by dispersing single droplets of the dispersed phase into the continuous phase with a nozzle or atomizer. The interfacial polymerization reaction then occurs using one of the following mechanisms:

1. Reaction illustrated by Equation 3 where the monomer is in the dispersed phase. In this manner, the shell material is deposited on the inter-side of the microcapsule.
2. Reaction illustrated by Equation 3 where the monomer is in the continuous phase. Here, the reaction occurs at the interface and deposits the polymer coating on the dispersed phase.
3. Reaction illustrated by Equation 4 where one monomer is in the dispersed phase and the other monomer is in the continuous phase. The polymerization reaction takes place at the interface.
4. Reaction illustrated by Equation 4 where both monomers are in the continuous phase. The polymer coating is deposited on the dispersed phase.

Figure 3:
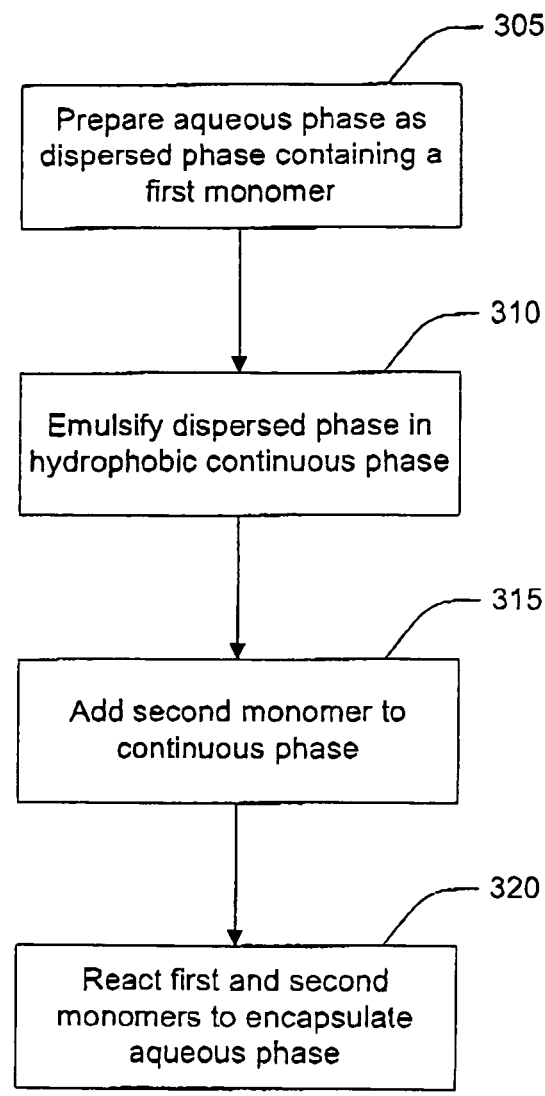
FIG. 3 is a flowchart of an interfacial polymerization encapsulation technique for encapsulation of aqueous droplets for use with embodiments of the invention.

FIG. 3 is a flowchart of an interfacial polymerization encapsulation technique for encapsulation of aqueous droplets for use with embodiments of the invention. While the example of FIG. 3 is representative of an interfacial polymerization containing one monomer in the dispersed phase and one monomer in the continuous phase, other techniques of interfacial polymerization may be used in the formation of encapsulated aqueous droplets in accordance with the invention.

At 305, an aqueous phase is prepared as a dispersed phase containing a first monomer. The aqueous phase is then emulsified in a hydrophobic continuous phase at 310. A second monomer is added to the continuous phase at 315. The first and second monomers are then reacted at 320 to form the polymer encapsulant around the dispersed droplets of the aqueous phase.

Upon isolation of the encapsulated aqueous droplets, the encapsulated droplets may be used in a variety of flame suppression systems or may be otherwise applied to a flame for suppression. For example, in a typical dry powder fire extinguisher or suppression system, the encapsulated aqueous droplets can be used as the dry powder. By applying the encapsulated aqueous droplets to a flame, the vaporization of the contained water and other mechanisms described above can be used to suppress the flame.

Figure 4:
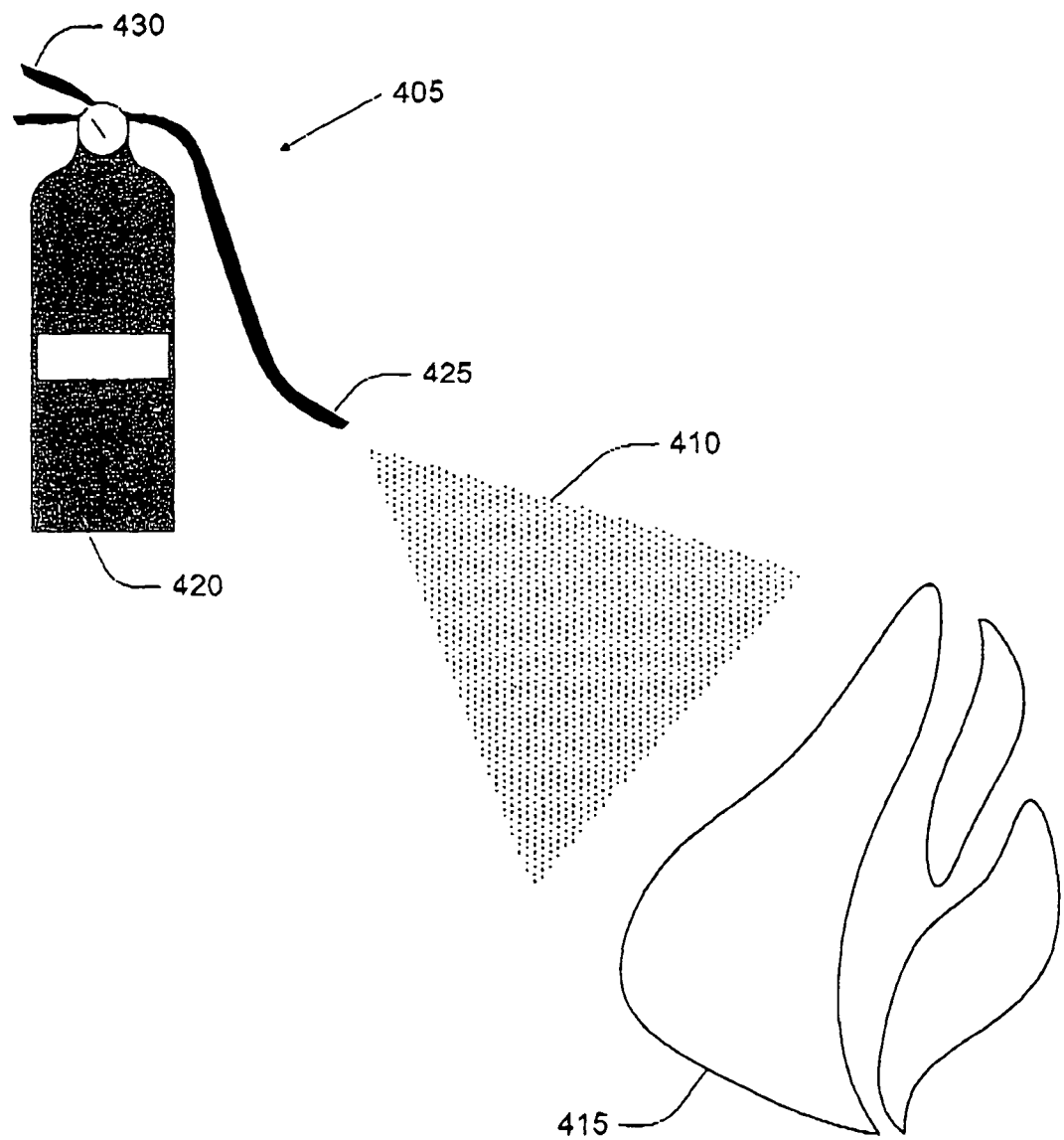
FIG. 4 is a simplified schematic of a fire suppression system in accordance with an embodiment of the invention.

FIG. 4 is a simplified schematic of a fire suppression system 405 in accordance with an embodiment of the invention. The fire suppression system 405 is depicted as a typical hand-held dry powder fire extinguisher However, other portable and fixed fire suppression systems may be used containing encapsulated aqueous droplets 410 in accordance with embodiments the invention. Encapsulated droplets 410 are applied to a flame 415 to extinguish, or at least suppress, the flame 415. In general, the fire suppression system 405 is a system capable of storing the encapsulated droplets 410 and then dispensing the encapsulated droplets 410 upon demand. For example, the system 405 includes a pressurized cylinder 420 or other container for storing the encapsulated droplets 410. The system 405 further includes a dispenser for dispensing the encapsulated droplets 410. For the example shown in FIG. 4, the dispenser, collectively includes the nozzle 425 and valve mechanism 430. Upon activation of the valve mechanism 430, the encapsulated droplets can be dispensed from the pressurized cylinder 420 through the nozzle 425. Other dispensing mechanisms are well known, including pneumatic dispensers, pump dispensers, centrifugal dispensers, dump dispensers, etc.

The following non-limiting examples set forth below illustrate specific examples of the manufacture of flame suppression agents in accordance with embodiments of the invention.

Example 1

Microencapsulation of Water in Poly(4-bromostyrene) by In-Liquid Drying

In this example, poly(4-bromostyrene), the encapsulating polymer, was dissolved in methylene chloride, and food-grade unflavored gelatin was used to gel water and to serve as the protective colloid. A solution of 1.023 g of poly(4-bromostyrene) dissolved in 10 mL of methylene chloride was used as the continuous organic phase. A second solution, which was used as the dispersed phase, contained 0.412 g of gelatin dissolved in 9.607 g of deionized (DI) water. These solutions were mixed in a 39 mL flat bottom culture tube at 10,000 rpm with a Fisher model 700 Homogenizer with a saw-tooth generator (10 mm×195 mm) for 30 seconds. The resulting emulsion was poured into a 502 g solution of DI water that contained 5.007 g of food-grade unflavored gelatin that was agitated at approximately 2100 rpm with the model 700 Homogenizer with a flat bottom generator (35 mm×195 mm). The solution was agitated for 5 minutes at ambient temperature, and then the temperature was increased to 40° C. and held there until the methylene chloride had evaporated (approximately 1 hr). Filtering the mixture through a 2.7-micron glass-microfiber filter isolated the resulting microencapsulated water/gel. The crude product was washed 3 times with 200 mL of DI water, 1 time with 100 mL of a 0.1% gelatin solution, and 1 time with 100 mL of a 50:50 (vol:vol) solution of isopropyl alcohol (IPA). This process produced 0.639 g of microencapsulated particles in the 5 to 40 micron size range. When the speed of the generator for the second stage was decreased from approximately 2100 rpm to approximately 1400 rpm, the size of the final encapsulated material increased from the range of about 5 to 40 microns, to the range of about 60 to 70 microns; however, some of the material was as large as 250 micron. In addition, the yield of the microencapsulated particles increased when the DI water used in second stage and subsequent washing was saturated with methylene chloride. The bromine content in the polymer/gelatin residue, measured by SEM/EDS was the same as the polymer, poly(4-bromostyrene), 44 percent, implying that the gelatin content in the final product was low. The amount of water microencapsulated based on weight loss at 105° C. was approximately 21 percent.

Example 2

Microencapsulation of Water with Poly(4-bromostyrene) by Selective Polymer Solubility In this example, the solubility of a polymer is controlled by the ratio of two miscible solvents, e.g., hexane and methylene chloride. The fire retardant polymer, e.g., poly(4-bromostyrene), is soluble in the methylene chloride, but generally insoluble in the hexane. In a first stage, a solution of 0.28 g poly(4-bromostyrene) in 5.6 g methylene chloride was prepared. In a second stage, an aqueous gel was prepared by mixing 0.002 g of methyl cellulose and 0.001 g of sorbitan sesquioleate (an emulsifier) in 0.5 g of DI water. The aqueous gel was dispersed into the polymer solution prepared in the first stage using a homogenizer, e.g., a Fisher model 700. The speed was controlled to 1800 rpm to produce the desired particle size. 10 g of hexane was slowly added to the dispersion, thus lowering the solubility of poly(4-bromostyrene) in methylene chloride and causing the polymer to deposit on the surface of the dispersed droplets of aqueous phase. The resulting thickness of the encapsulating polymer is controlled by the ratio of polymer to dispersed aqueous phase. The final microencapsulated particles were in the 20 to 40 micron size.

Example 3

Microencapsulation of Water with Poly(1,6-hexamethlylene tetrabromoterephthalate) by Interfacial Polymerization In a first stage, an aqueous solution was prepared by dissolving 0.0073 g of 1,6-hexamethlyene diamine in 0.25 g water followed by the addition of 0.0029 g of sorbitan sesquioleate, 0.0041 g of sodium hydroxide, and 0.0013 g of methyl cellulose. In a second stage, a solution of 0.025 g of tetrabromoterephthaloyl chloride in 2.5 g of methylene chloride was prepared. 3.5 g of mineral spirits were added to a suitable mixing vessel followed by the addition of the aqueous solution prepared in the first stage. Next the solution prepared in the second stage was slowly added to the mixing vessel. This mixture was emulsified with a Fisher Model 700 Homogenizer at approximately 2800 rpm for 2 to 5 seconds. The desired speed is dependent upon the desired particle size, but, in general, increased agitation results in smaller particles. The reaction mixture was filtered through a 2.7-micron glass microfiber filter to isolate the microcapsules in the 5 to 20 micron size range. When toluene was substituted for mineral spirits and mixed in the same way, the isolated particles were in the 15 to 60 micron size range. A third variation on this process that used the same solutions prepared in the first and second stages, started by mixing 7 g of mineral spirits and the solution prepared in the second stage in a suitable mixing vessel. Then the solution prepared in the first stage was slowly added to the mixture in the mixing vessel through a fine capillary tube, which produced very small droplets of the first stage solution in the mineral spirit/second stage solution. These small droplets of the first stage solution were microencapsulated by the second stage solution to yield particles in the 10 to 50 micron size range.

Conclusion

Aqueous droplets encapsulated in a flame retardant polymer have been described for use in suppressing combustion. Upon exposure to a flame, the encapsulated aqueous droplets rupture and vaporize, removing heat and displacing oxygen to retard the combustion process. The polymer encapsulant, through decomposition, may further add free radicals to the combustion atmosphere, thereby further retarding the combustion process. The encapsulated aqueous droplets may be used as a replacement for halon, water mist and dry powder flame suppression systems.

What is claimed is:

1. A flame suppression agent, comprising:
   aqueous droplets encapsulated in a flame retardant polymer, whereby said flame suppression agent is capable of suppressing flames; and wherein said flame suppression agent is non-toxic.

2. The flame suppression agent of claim 1, wherein the aqueous droplets have a size of approximately 5-250 microns.

3. The flame suppression agent of claim 1, wherein the aqueous droplets consist essentially of water.

4. The flame suppression agent of claim 1, wherein the aqueous droplets comprise water and a gelling agent.

5. The flame suppression agent of claim 4, wherein the gelling agent is selected from the group consisting of gelatin and methyl cellulose.

6. The flame suppression agent of claim 1, wherein the flame retardant polymer decomposes under heat to produce free radicals.

7. The flame suppression agent of claim 6, wherein the flame retardant polymer is a halogenated polymer.

8. The flame suppression agent of claim 7, wherein the flame retardant polymer is a brominated polymer.

9. The flame suppression agent of claim 8, wherein the brominated polymer is poly(4-bromostyrene).

10. The flame suppression agent of claim 8, wherein the brominated polymer is poly(1,6-hexamethylene tetrabromoterephthalamide).

11. A method of suppressing a flame, comprising:
    applying polymer-encapsulated aqueous droplets to the flame to suppress the flame, wherein said polymer-encapsulated aqueous droplets comprise aqueous droplets encapsulated in a flame retardant polymer; and wherein said flame suppression agent is non-toxic.

12. The method of claim 11, wherein the aqueous droplets contain essentially water.

13. The method of claim 11, wherein the aqueous droplets contain water and a gelling agent.

14. The method of claim 11, wherein the aqueous droplets are encapsulated in a polymer which decomposes to produce free radicals.

15. The method of claim 14, wherein the aqueous droplets are encapsulated in a halogenated polymer.

16. The method of claim 15, wherein the halogenated polymer is a brominated polymer.

17. The method of claim 16, wherein the brominated polymer is selected from the group consisting of poly(4-bromostyrene) and poly(1,6-hexamethylene tetrabromoterephthalamide).

18. A fire suppression system, comprising:
a container containing encapsulated aqueous droplets, wherein said encapsulated aqueous droplets comprise aqueous droplets encapsulated in a flame retardant polymer; and wherein said flame suppression agent is non-toxic; and
a dispenser for dispensing the encapsulated aqueous droplets from the container upon demand to suppress flames.

19. The fire suppression system of claim 18, wherein the aqueous droplets contain essentially water.

20. The fire suppression system of claim 18, wherein the aqueous droplets contain water and a gelling agent.

21. The fire suppression system of claim 18, wherein the container is a pressurized container.

22. The fire suppression system of claim 18, wherein the fire suppression system is a dry powder fire extinguisher.

23. The fire suppression system of claim 18, wherein the aqueous droplets are encapsulated in a polymer which decomposes to produce free radicals.

24. The fire suppression system of claim 23, wherein the aqueous droplets are encapsulated in a halogenated polymer.

25. The fire suppression system of claim 24, wherein the halogenated polymer is a brominated polymer.

26. The fire suppression system of claim 25, wherein the brominated polymer is selected from the group consisting of poly(4-bromostyrene) and poly(1,6-hexamethylene tetrabromoterephthalamide).

\* \* \* \* \*